US010142480B2

(12) United States Patent
Pearce et al.

(10) Patent No.: US 10,142,480 B2
(45) Date of Patent: *Nov. 27, 2018

(54) MESSAGE STORAGE (71) Applicant: Microsoft Technology Licensing, LLC, Redmond, WA (US)

(72) Inventors: Steve Pearce, London (GB); Daniel James Chastney, Sunnyvale, CA (US); Giampiero M. Sierra, London (GB); Antonio Pedro Pernambuco Rezende, London (GB); Soramist Chintanamanus, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/294,411

(22) Filed: Oct. 14, 2016

(65) Prior Publication Data

US 2017/0070614 A1    Mar. 9, 2017

Related U.S. Application Data (63) Continuation of application No. 14/530,639, filed on Oct. 31, 2014, now Pat. No. 9,509,848.
(Continued)

(51) Int. Cl.
*H04M 3/53* (2006.01)
*H04W 4/12* (2009.01)
(Continued)

(52) U.S. Cl.
CPC ........ *H04M 3/5315* (2013.01); *G06Q 10/107* (2013.01); *H04L 51/22* (2013.01);
(Continued)

(58) Field of Classification Search
CPC . H04M 3/5315; H04M 3/53366; H04W 4/12; H04W 4/16; H04L 51/22; G06Q 10/107
(Continued)

(56) References Cited

U.S. PATENT DOCUMENTS 6,292,473 B1    9/2001  Duske et al.
6,628,936 B1    9/2003  Furuya
(Continued)

FOREIGN PATENT DOCUMENTS

CN      101883185       11/2010
EP      2362592         8/2011
WO      WO-1993009520   5/1993

OTHER PUBLICATIONS

"International Search Report and Written Opinion", Application No. PCT/US2015/037849, dated Sep. 14, 2015, 11 pages.
(Continued)

*Primary Examiner* — Huy C Ho
(74) *Attorney, Agent, or Firm* — Schwegman Lundberg & Woessner, P.A.

(57) ABSTRACT

A messaging application receives a sequence of user-consumable messages directed to at least one destination user. The messages are stored in non-volatile storage comprising one or more non-volatile storage devices, and the messages consist of a number of consumed messages having been consumed by the destination user, and a number of unconsumed messages not yet having been consumed by the user. An automatic message manager is configured to implement different respective retention policies for the consumed messages and the unconsumed messages. The retention policy for the consumed messages comprises automatically determining when the number of consumed messages exceeds a threshold for consumed messages, and in response automatically deleting at least one of the consumed mes-
(Continued)

sages from the non-volatile storage so as to bring the number of consumed messages back within the threshold for consumed messages.

20 Claims, 3 Drawing Sheets

Related U.S. Application Data (60) Provisional application No. 62/019,243, filed on Jun. 30, 2014.

(51) Int. Cl.
*H04W 4/16* (2009.01)
*H04M 3/533* (2006.01)
*H04L 12/58* (2006.01)
*G06Q 10/10* (2012.01)

(52) U.S. Cl.
CPC ......... *H04M 3/53366* (2013.01); *H04W 4/12* (2013.01); *H04W 4/16* (2013.01)

(58) Field of Classification Search
USPC ...................................................... 455/412.1
See application file for complete search history.

(56) References Cited

U.S. PATENT DOCUMENTS

| | | | |
|---|---|---|---|
| 7,254,410 B2 * | 8/2007 | Park ...................... | H04W 4/14 |
| | | | 455/412.1 |
| 7,647,383 B1 | 1/2010 | Boswell et al. | |
| 8,180,834 B2 | 5/2012 | Kay et al. | |
| 8,583,747 B2 | 11/2013 | Buchheit et al. | |
| 9,509,848 B2 | 11/2016 | Pearce et al. | |
| 2006/0143150 A1 | 6/2006 | Hobson et al. | |
| 2011/0217954 A1 * | 9/2011 | Lee ...................... | G06Q 10/107 |
| | | | 455/412.1 |
| 2013/0055112 A1 | 2/2013 | Joseph et al. | |
| 2013/0325990 A1 | 12/2013 | Tysowski et al. | |
| 2013/0332851 A1 | 12/2013 | Klassen et al. | |
| 2015/0381813 A1 | 12/2015 | Pearce et al. | |

OTHER PUBLICATIONS

"Non-Final Office Action", U.S. Appl. No. 14/530,639, dated Apr. 7, 2016, 15 pages.

"Notice of Allowance", U.S. Appl. No. 14/530,639, dated Aug. 9, 2016, 9 pages.

Warden,"Request: Watched/Unwatched Indicator for Video Files", Retrieved From: <http://www.acryan.com/forums/viewtopic.php?f=39&t=2389> Jun. 16, 2014, Oct. 25, 2009, 3 Pages.

"Office Action Issued in European Patent Application No. 15736135. 3", dated Mar. 2, 2018, 8 Pages.

"Office Action Issued in European Patent Application No. 15736135. 3", dated Jul. 20, 2018, 8 Pages.

* cited by examiner

Oldest                                                                                          Newest (i) ... (q)

3  4  5  6  7  8  9  10  11  12  13  14  15  16  17  18  19

(T)

11  12  13  14  15  16  17  18  19  20  21  22  23  24  25  26  27

(T+1)

11  12  13  15  16  17  18  19  20  21  22  23  24  25  26  27

= unviewed      = viewed

Figure 5

MESSAGE STORAGE

RELATED APPLICATIONS

This application is a continuation of and claims priority to U.S. Utility patent application Ser. No. 14/530,639, filed on Oct. 31, 2014 which in turn claims priority under 35 U.S.C. § 119(e) to U.S. Provisional Patent Application No. 62/019,243 filed on Jun. 30, 2014, the disclosures of which are incorporated in their entirety by reference herein.

BACKGROUND

Ephemeral messaging refers to arrangements whereby one user sends a message such as a picture message to a destination user, typically over the Internet, and the message is only allowed to be temporarily available on the destination user's terminal. I.e. the receiving instance of the ephemeral messaging application is configured to automatically delete the message after a certain amount of time has elapsed since the message was received, perhaps only a few seconds. The purpose of this is privacy, so that the destination user cannot continue to view the message indefinitely, or redistribute the message against the sending user's will.

Voice mail services such as commonly provided in mobile cellular networks also automatically delete messages, but still only based on the amount of time elapsed since each message was received. I.e. a user (the callee) has access to a mailbox which is able to record and store a voicemail from the caller whenever the callee misses a callee, and the messages remains available to the callee to access for a certain number of days or weeks, after which the service automatically deletes the message. The purpose here is to stop the inbox becoming cluttered with an unwieldy number of messages.

In one previously proposed scheme that is somewhat different to ephemeral messaging applications and voicemail services, messages are received at a pager and are stored in a finite number of message slots corresponding to the pager's maximum storage capacity, and the messages are deleted not after a predetermined time has elapsed, but rather once the total number of messages has reached the maximum possible number of message slots. I.e. if a new message is received and the total number of messages has already reached the maximum, an existing message is deleted to accommodate the new message. If there are both read and unread messages in the slots, read messages are deleted in preference to unread messages. The scheme was proposed in the early 1990s when portable user devices had a very limited storage capacity, even for very simple textual messages, but as storage capacities of user devices rapidly accelerated the scheme has apparently lost relevance and is not seen in modern devices, as far as the authors of the present application are aware.

SUMMARY

One consideration that may be noted with the prior scheme acknowledged above, is that it is only concerned with the total number of messages due to storage capacity, i.e. message deletion is triggered when the total number of read plus unread messages reaches a maximum limit. An effect of this rule is that, even though read messages are deleted before unread messages, if there are no read messages to delete when a new message arrives then unread messages will be deleted. As storage capacities are much greater nowadays, there would be no need to apply a similar rule even when the message are not necessarily textual messages but potentially pictures, audio messages or even video messages; and nor would it be desirable to apply such a rule, as the inventors consider that the fate of unread, unviewed or un-listened-to messages (i.e. unconsumed messages) should not be left to chance in terms of how many read, viewed or listened-to messages (consumed messages) there might happen to be presently in storage. Nonetheless, even with increased storage capacities, it may still be desirable that the number of stored messages does not go completely unchecked, and particularly that consumed messaged are not allowed to accumulate indefinitely.

According to one aspect disclosed herein, there is provided a device comprising a messaging application, non-volatile storage comprising one or more non-volatile storage devices, and an automatic message manager. The messaging application is for receiving a sequence of user-consumable messages directed to at least one destination user (from one or more sending users), and the storage is arranged to store the received messages. For example the messages may comprise media messages such as video messages, audio messages (e.g. voice messages) or picture messages, or a combination of these. The messages in the storage consist of a number of consumed ones of these messages having been consumed by the destination user (e.g. viewed or listened-to), and a number of unconsumed ones of the messages not yet having been consumed by the user (e.g. unviewed or un-listened-to). The automatic message manager is configured to implement different respective retention policies for the consumed messages and the unconsumed messages. The retention policy for the consumed messages comprises automatically determining when the number of consumed messages (not including unconsumed messages) exceeds a threshold for consumed messages, and in response automatically deleting at least one of the consumed messages from the non-volatile storage, so as to bring the number of consumed messages back within the threshold for consumed messages.

For example, the messages may have an order from oldest to newest (e.g. in order of when received), and the deletion may comprise deleting the oldest one or more consumed messages. The automatic message manager may delete just enough messages to bring the number of consumed messages back within the threshold (e.g. if it exceeds the threshold by one, the message manager only deletes one message, in embodiments the oldest).

In some embodiments, the retention policies for the consumed and unconsumed messages are independent of one another. That is, the number of consumed messages affects neither retention nor deletion of the unconsumed messages, and the number of unconsumed messages affects neither retention nor deletion of the consumed messages.

In embodiments, the messages of said sequence are all of the presently received and stored messages of a particular conversation, and therefore the automatic message manager implements the retention policy (for at least the consumed messages) on a per conversation basis.

There are different options for the retention policy for the unconsumed messages. For example, the unconsumed messages may never be automatically deleted by the automatic message manager regardless of the number of unconsumed messages, such that the number of unconsumed messages is limited only by the storage capacity. As another example, the retention policy for the unconsumed messages may comprise automatically determining when the number of unconsumed messages exceeds a threshold for unconsumed messages, and in response automatically deleting at least one of the unconsumed messages from the non-volatile storage so as to bring the number of unconsumed messages back within this threshold. In this case, the threshold for unconsumed messages will be greater than the threshold for consumed messages.

In embodiments, the device may be a user terminal or a server, and the messaging application may be a client application or a serving application respectively. In the former case, messages are either downloaded from a server or received directly from a sending user, and the messages are stored on the user terminal and expire on the user terminal when the threshold is reached. In the latter case, the messages are made available to be downloaded to the destination user terminal from the server, but the retention policy is applied at the server such that messages expire on the server.

According to another aspect disclosed herein, there is provided a corresponding computer program.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

The following discloses a scheme whereby messages (e.g. video messages) are selectively deleted based on whether or not the messages have been read. A threshold number of read messages are stored belonging to the same conversation, and a greater number of unread messages are allowed to be stored (in one embodiment an infinite number). Available storage is this optimized for unread content (or at least favours unread content). Storage may be local (client side) or remote (server side). In the case where content is stored remotely, an additional effect may be that less data is downloaded to the client, since the amount of read data downloaded is limited.

Figure 1:
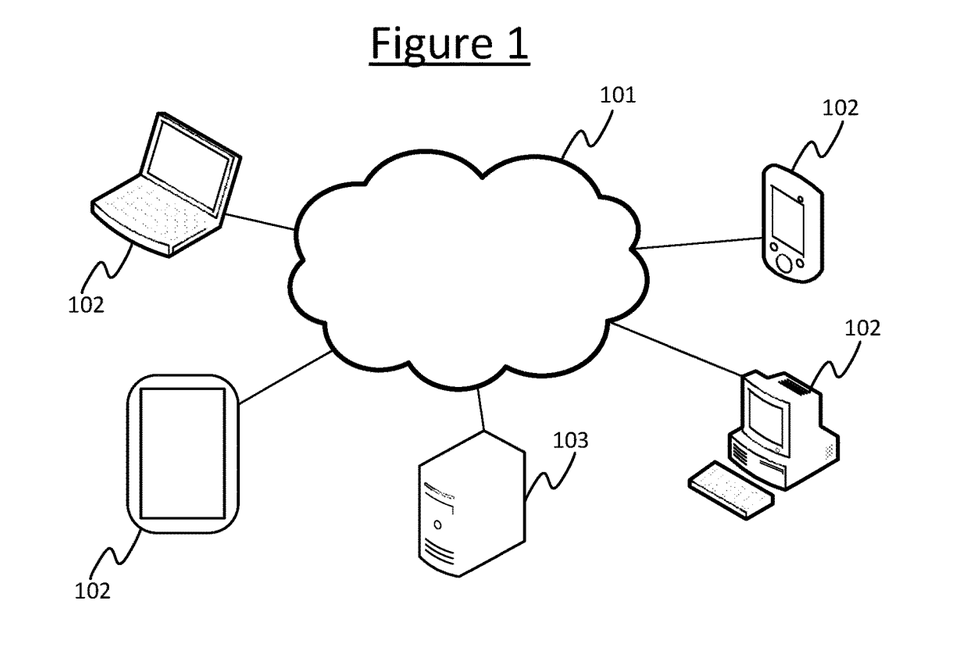
FIG. 1 is a schematic diagram of a communication system.

FIG. 1 shows an example of a communication system in which the teachings of the present disclosure may be implemented. The system comprises a communication medium 101, in embodiments a communication network such as a packet-based network, for example comprising the Internet and/or a mobile cellular network (e.g. 3GPP network). The system further comprises a plurality of user terminals 102, each operable to connect to the network 101 via a wired and/or wireless connection. For example, each of the user terminals may comprise a smartphone, tablet, laptop computer or desktop computer. In embodiments, the system also comprises a server 103 connected to the network 101. The term server as used herein refers to a logical server, which may comprise one or more physical server units at one or more physical sites (i.e. the server 103 may or may not be distributed over multiple different geographic locations).

Figure 2:
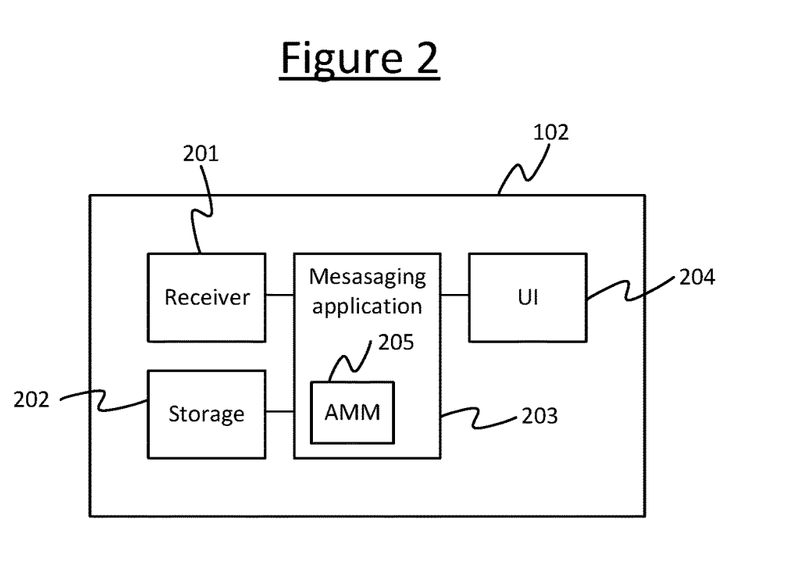
FIG. 2 is a schematic block diagram of a user terminal.

FIG. 2 shows an example of one of the user terminals 102 in accordance with embodiments disclosed herein. The user terminal 102 comprises a receiver 201 for receiving data from one or more others of the user terminals 102 over the communication medium 101, e.g. a network interface such as a wired or wireless modem for receiving data over the Internet or a 3GPP network. The user terminal 102 also comprises a non-volatile storage 202, i.e. non-volatile memory, comprising one or more internal or external non-volatile storage devices such as one or more hard-drives and/or one or more EEPROMs (sometimes also called flash memory). Further, the user terminal comprises a user interface 204 comprising at least one output to the user, e.g. a display such as a screen, and/or an audio output such as a speaker or headphone socket. The user interface 204 will typically also comprise at least one user input allowing a user to control the user terminal 102, for example a touch-screen, keyboard and/or mouse input.

Furthermore, the user terminal 102 comprises a messaging application 203, which is configured to receive messages from a complementary instance of the messaging application on another of the user terminals 102, or the server 103 (in which cases the messages may originate from a sending user terminal sending the messages via the server 102, and/or may originate from the server 103). For example, the messaging application may allow users to leave video messages, e.g. a "talking head" video message captured from a front-facing camera of the sending user terminal, or a video message sharing a scene captured from a rear-facing camera of the sending user terminal. The present disclosure is particularly useful in the case of video messages which tend to incur the most storage, but the teachings can also be used in relation to other types of message such as other media messages, e.g. picture messages (still images) or audio messages (such as voice messages). Potentially the messages could include textual messages such as IM (instant messaging) messages. N.B. video message may optionally comprise audio, but an audio message do not comprise video. Video messages can include videos captured by a camera, animations, and/or screen sharing recordings.

The messaging application is configured to receive the messages over the network 101 (or more generally the communication medium) via the receiver 201, and to store the received messages in the storage 202. For the purpose of the following discussion, the described user terminal 102 will be considered as the receiving (destination) user terminal, receiving the messages from one or more other, sending ones of the user terminals 102. However, it will be appreciated that the messaging application 203 receiving user terminal 102 and may also be able to send messages in the other direction to the complementary instances of the application on the sending user terminals and/or server 103 (e.g. as part of the same conversation), also over the network 101 or other such communication medium.

The receiving messaging application 203 is configured to output, to the user via the user interface 204, an indication that the messages have been received and are currently stored in the storage 202, e.g. by displaying a respective indication such as an icon representing each received messages. The indications may be displayed in some convenient order such as chronological order from oldest to newest, e.g. in terms of time since receipt by the messaging application, or time since creation or sending by the sending application on the sending user terminal, or time since sent by the server.

The messaging application 203 is also configured to play out the content of messages themselves via the user interface 204, i.e. play out the video of a video message via a screen, and/or play out the audio of an audio message or video message via a speaker or headphones, and/or display the still image of a picture message via a screen. In embodiments, the user is able to select one of the indications of the messages (e.g. message icons) displayed a screen or other display of the user interface 204, and in response the messaging application plays out the content of the corresponding selected message.

In embodiments, the messaging application is configured to display the indications of the messages on a per conversation basis, i.e. with the indications grouped into conversations such that all of the presently received, stored messages of a given conversation are grouped together on the display of the user interface 204 (and if more than one conversation is present the indications of each conversation will be grouped together into different respective groups within the user interface 204). N.B. this doesn't necessarily mean all the presently received, stored messages of a given conversation have to be visible on the display at once, e.g. the user may have to scroll through a conversation to see all the indications.

The concept of a conversation is itself well understood in the field of messaging applications. A conversation is a logical thread of content, arranged under the same conversation ID used by the messaging application (though the users need not be aware of the ID). Following the first message of a conversation, each subsequent message is deemed part of the same conversation as it is entered as such by the sending user in a part of the user interface of his or her messaging application which represents the conversation in question. The subsequent message is typically a response to or relates to a preceding message of the conversation, though potentially a user could send a completely unrelated message as part of the same conversation. A given conversation typically involves some or all of the same users, but users can leave a conversation and new users can join (usually only with permission from one or more existing users). Also different conversations can be formed form the same users.

Figure 3:
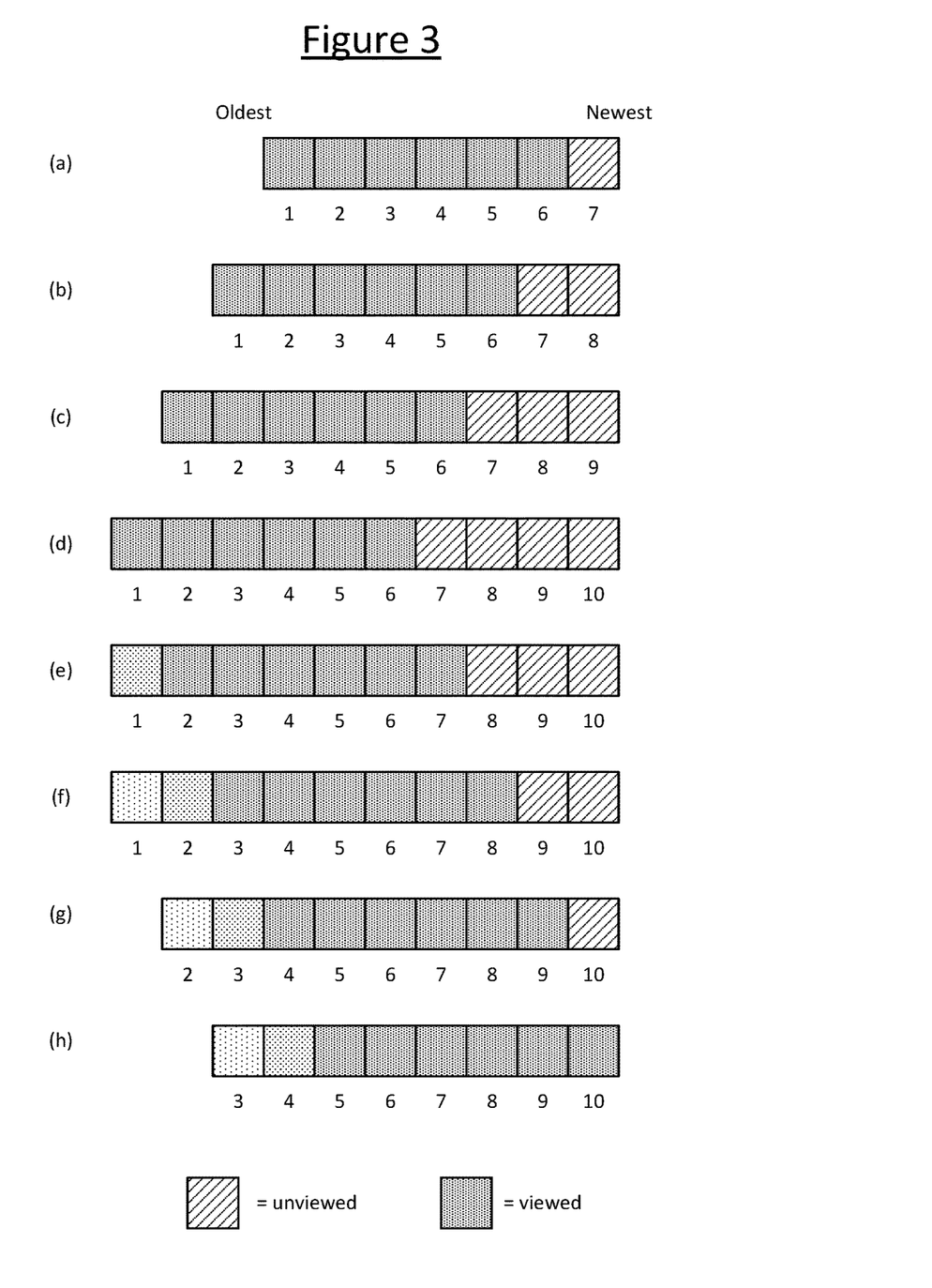
FIG. 3 is a schematic illustration of a sequence of received messages.

FIG. 3(a) schematically illustrates an example of how the indications of a particular conversation may appear to the user within the display of the user interface 204. In the illustrated example, the messaging application 203 has so far received (via the receiver 201) and stored (in the storage 202) eight messages as part of the same conversation. The messages are labelled here 1 to 7 (and so forth for subsequent messages) in order from oldest to newest (e.g. most distantly received to most recently received).

Each message 1 to 7 is represented in the display (of the user interface 204) by a respective icon, illustrated schematically in FIG. 3 above each respective label 1 to 7. In one embodiment, the icons are arranged on screen in a "ribbon", i.e. one-after-another in a line ordered from oldest to newest (e.g. in order of age since receipt). The labels 1 to 7 may also be part of the displayed indications in the user interface 204, or may just be labels used here as part of this application for reference.

The user can select (e.g. click on or touch) the message icons in the ribbon, and thus trigger the messaging application to output the content of the respective message via the user interface 204 (e.g. play out the video and/or audio of the message).

In embodiments, the messaging application 203 is a video messaging application exclusively for receiving (and potentially sending) video messages such that all the messages 1 to 7 (and subsequent messages) are video messages. In other embodiments, the application is capable of receiving (and potentially sending) other types of messages, but a given conversation consists of only messages of a given media type, and all the messages 1 to 7 (and subsequent messages of the conversation) are video messages. Alternatively, the messaging application 203 may deal exclusively in audio messages, or exclusively picture messages (still images), or all the messages of a given conversation may be restricted to just audio message, or just picture messages. Alternatively, the messaging application 203 may allow messages of different media types to form part of the same conversation. In embodiments, pure textual messages such as IM messages may or may not be allowed to amongst the media messages. The following will be described in terms of video messages, but it will be understood this is not limiting to all possible embodiments.

The messaging application 203 comprises or is associated with an automatic message manager (AMM) 205 for automatically deleting messages from the user terminal's storage 202, in order to manage the amount of storage space is incurred by the messages. In accordance with the present disclosure, this is based on whether messages are still unviewed or have already been viewed (or more generally whether they are unconsumed or consumed). The automatic message manager 205 may be implemented in software, e.g. as part of the messaging application 203 or a plug-in logically coupled to it. Alternatively it is not excluded that some or all of the automatic message manager 205 could be implemented in dedicated hardware.

Figure 4:
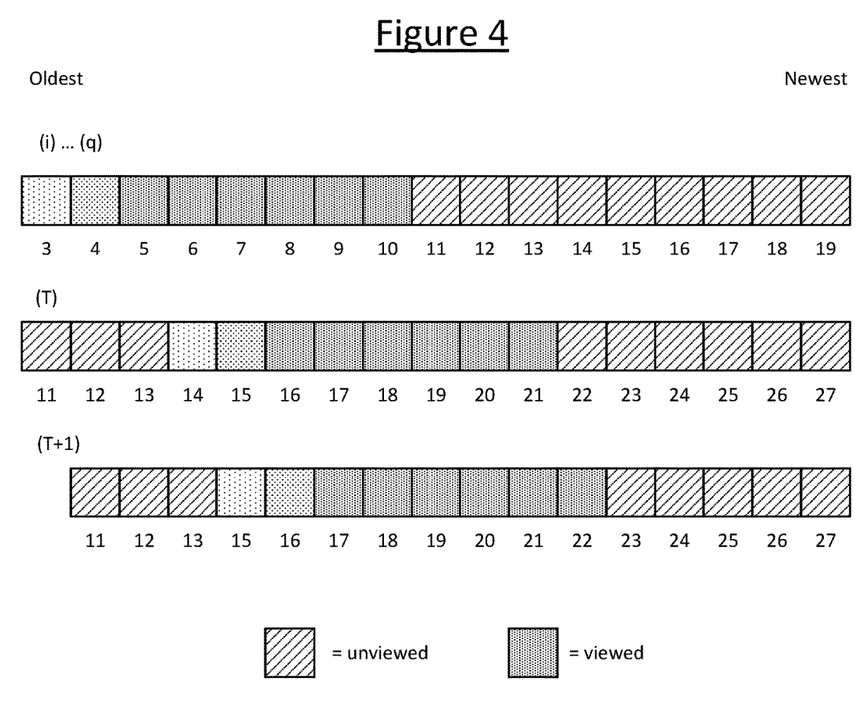
FIG. 4 is a further schematic illustration of a sequence of receive messages.

The messaging application 203 is configured to keep a record of which of the messages presently in the storage 202 have already been viewed (or consumed), and which have not yet been viewed (or consumed). For example, the messaging application 203 may store a respective flag in the storage 202 in association with each stored message, to mark whether the respective message is viewed or unviewed. The icons or indications of the messages may also be displayed differently depending on whether the respective messages are viewed or unviewed. E.g. each of the icons indicating an unviewed message may be displayed as a thumbnail its respective message, while each of the icons indicating a viewed message may be displayed as a greyed-out, faded or otherwise discoloured thumbnail of its respective message. The different in appearance is illustrated schematically in FIGS. 3 (and 4) by showing unviewed messages cross-hatched and viewed messages dotted.

Based on the information maintained by the messaging application as to whether messages are viewed or on viewed (or more generally consume or unconsumed), the automatic message manager 205 is configured to implement separate message retention policies for the viewed and unviewed messages presently in the storage 202. In some embodiments these policies are completely separate form one another, i.e. so the unviewed messages have no bearing on what happens to the viewed messages and vice versa. Thus although the message icons may be displayed as part of the same chronological ribbon or thread on screen, "behind the scenes" the message manager 205 is configured to partition them into two separate logical buffers.

In embodiments the retention policies for the viewed and unviewed messages are as follows.

For viewed messages, the messages automatically degrade beyond a certain threshold. I.e. the message manager 205 is configured to automatically recognise when the number of viewed messages in the storage 202 for a particular conversation (just viewed messages, not the total number of viewed +unviewed messages in the conversation) has exceeded a threshold allowed for the number of viewed messages per conversation. In response to this, the message manager 205 automatically deletes the number of messages required to bring the number of viewed messages in the storage 202 back down to the threshold. For example in embodiments this threshold is eight viewed messages per conversation, so if a ninth message of the conversation is viewed then the message manager 205 automatically deletes one other of the viewed messages (the messages may only ever be viewed one at a time, so this may always amount to deleting just one other message, but is not excluded that two or more messages could be viewed at once before the message manager 25 has a chance to perform its deletion, in which case it would delete two or more other messages accordingly). In embodiments, the message manager 204 is configured to always select the oldest one or more viewed messages of the conversation to delete when one or more new messages of that conversation are viewed.

For unviewed messages, in embodiments the automatic message manager 205 does not place limit placed on the number of unviewed messages that may be stored in the storage 202, such that the number of unviewed messages is effectively infinite (limited only by the capacity of the storage). (N.B. so doing nothing in relation to the unviewed messages is considered one example of a "retention policy" for the purpose of the present disclosure.) Alternatively, the message manager 205 may be configured to place an automatic limit on the number of unviewed messages allowed in the storage 202 per conversation, with this limit being larger than the limit on the number viewed messages. E.g. the unviewed messages could be degraded beyond a threshold of, say, twenty messages, or one hundred messages (and in embodiments the oldest one or more unviewed messages required to bring the number of unviewed messages back within the respective threshold for the conversation).

Note that the threshold on the number of unviewed messages is not dictated by the maximum storage capacity of the storage 202 in which the messages are being stored—it does not take into account the number of unviewed messages and so does not take into account the total number of messages in the storage 202. This means the threshold on the number of viewed messages therefore causes messages to be deleted even when sufficient storage capacity still remains in the storage 202 to store more messages, and indeed even though storage capacity may still be plentiful. This may be desirable as the storage 202 may also be used by other applications running on the user terminal 102 (not shown). The degrading mechanism of the present disclosure prevents the number of messages growing completely unchecked, but without imposing an overly restrictive limit based on the total number of viewed plus unviewed messages. N.B. delete herein means delete from storage, so the message in question no longer prevents the storage space it previously incurred from being used for other purposes.

FIGS. 3 and 4 show an example of the operation of the automatic message manager 205 in an illustrative embodiment where a maximum of eight viewed messages per conversation and an infinite number of unviewed messages are allowed to be stored in the storage 202.

Beginning from the situation shown in step (a) of FIG. 3, in the illustrated conversation the messaging application 203 currently has one unviewed message 7 (the newest, e.g. most recently received) stored in the storage 202, and six viewed messages 1 to 6 (all older, e.g. previously received, with 1 being the oldest and 6 being the newest). At step (b), the messaging application 203 receives a new message 8 of the same conversation, which it stores in the storage 202 with the status of unviewed. As this message is unviewed, it does not increment the number of viewed messages and so does not affect the viewed messages 1 . . . 6 in the storage 202 for the conversation in question. Also as there is no limit on the number of unviewed messages, the new message 8 does not affect the other unviewed message 7.

At step (c), the messaging application 203 receives another new message 9 of the same conversation, which it again stores in the storage 202 with the status of unviewed. Again as this message is unviewed, it does not increment the number of viewed messages and so does not affect the viewed messages 1 . . . 6 in the storage 202; and as there is no limit on the number of unviewed messages, the new message 9 does not affect the other unviewed messages 7 & 8. At step (d), the messaging application 203 receives yet another new message 10 of the conversation, which it again stores in the storage 202 with the status of unviewed; and this message does not add to the number of viewed messages nor affect the existing viewed and unviewed messages 1 . . . 9 in the storage 202, for the same reasons discussed in relation to steps (b) and (c). Note that at steps (c) and (d), there are more than eight messages in the storage 202 for the conversation in question, but this does not cause any messages to be automatically deleted as eight is the limit on the number of viewed messages, not on the total number of viewed +unviewed messages.

At step (e) the user uses the messaging application 203 to view one of the unviewed messages, e.g. the oldest unviewed message 7. In response the messaging application 203 changes the status of this message 7 to viewed. The number of viewed messages in the conversation is now increased seven, but this is still below the threshold of eight, so no messages are automatically deleted yet. At step (f) the user uses the messaging application 203 to view another of the unviewed messages, e.g. the next oldest unviewed message 8. Again, in response the messaging application 203 changes the status of this message 8 to viewed. The number of viewed messages in the conversation is now increased eight, but this is still within the threshold of eight, so no messages are automatically deleted yet (equal to the threshold may be considered within the threshold).

At step (g) the user uses the messaging application 203 to view another of the unviewed messages, e.g. the next oldest unviewed message 9, and in response the messaging application 203 changes the status of message 9 to viewed. The number of viewed messages in the conversation is now increased nine, which is above the threshold. The automatic message manager 205 detects this, and in response deletes the oldest viewed message in the conversation, message 1, thus bringing the number of viewed messages in the storage 202 for the conversation in question back down to the maximum of eight.

Similarly at step (h) the user uses the messaging application 203 to view yet another one of the unviewed messages, e.g. the next oldest unviewed message 10, and in response the messaging application 203 changes the status of message 10 to viewed. The number of viewed messages in the conversation is now increased again nine, which is again above the threshold. The automatic message manager 205 detects this, and in response deletes the oldest viewed message in the conversation, this time message 2, thus bringing the number of viewed messages in the conversation in question back down to the maximum of eight.

Referring to FIG. 4, at steps (i) to (q), the messaging application 203 receives another nine messages 11 ... 19 respectively, of the same conversation as messages 1 ... 10. The messaging application stores each of the new messages 11 ... 19 in the storage 202, marked as unviewed. There are now more than eight messages in total and indeed more than eight unviewed messages. However, this does not cause any messages to be automatically deleted as the limit only applies specifically to viewed messages, of which there are still only eight (messages 3 ... 10).

Note that in embodiments, the policy for deleting viewed messages is not dependent on the relative chronological order of the unveiwed messages relative to the viewed messages, or any logical dependency of unviewed messages on viewed messages in terms of content. E.g. consider some later time T as shown in FIG. 4 where the messaging application has received another eight new messages 20 ... 27 as part of the same conversation as messages 1 ... 19, which it again stores in the storage 202. For whatever reason, the user has viewed all of messages 14 ... 21 without having viewed earlier messages 11 ... 13 or later messages 22 ... 27. Previous messages 1 ... 10 have all been viewed and automatically deleted in accordance with the message deletion rule. Now consider a situation at time T+1 where the user next selects to view message 22, leaving earlier messages 11 ... 13 and later messages 23 ... 27 still unviewed. There are now nine viewed messages, more than the threshold of eight. In accordance with embodiments disclosed herein, the automatic message manager 205 will detect this and will still delete the oldest viewed message 14, regardless of the fact that it may disrupt a logical chain of content between the earlier unviewed messages 11 ... 13 and the later unviewed messages 23 ... 27. However, this strict approach is not essential in all possible embodiments, and in other embodiments the retention policy for viewed messages could be designed with one or more caveats on the application of the viewed message threshold.

In further embodiments, messages that are about to disappear will be visually distinct from the others. For instance, viewed messages that are within some predetermined number n from the end of the viewed message buffer, i.e. the n closest to being deleted according to the order which deletion is based on (e.g. the n oldest), may be displayed to the user somewhat differently that the other viewed messages to indicate they are close to being automatically deleted. E.g. these may be displayed more faded, greyed or transparent than the other viewed messages. In embodiments, an extent of the difference in appearance (e.g. how faded, greyed or transparent) may increase with proximity to deletion in the deletion order (e.g. increase with age) over some or all of the viewed messages. In the example of FIGS. 3 and 4, n=2, such that the oldest two viewed messages appear more faded, with the oldest being the most faded and the second oldest being slightly less faded.

The above has been described in terms of an automatic message manager 205 being implemented on a user terminal 102, managing messages stored on the user terminal. However, in alternative or additional embodiments, a version of the automatic message manager 205' may be implemented on a server 103 from which messages are mad available for download to the destination user terminal 102.

Figure 5:
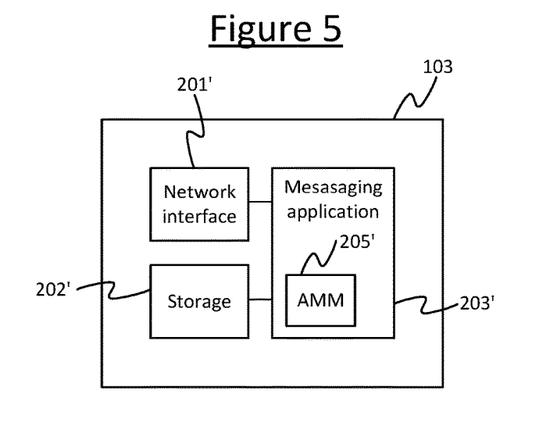
FIG. 5 is a schematic block diagram of a server.

FIG. 5 shows an example of the server 103 in accordance with embodiments disclosed herein. The server 103 comprises a network interface 201', a non-volatile storage 202' comprising one or more non-volatile storage devices, and a server-side version of the messaging application 203' comprising or associated with a server-side version of the automatic message manager 205'. The server-side messaging application 203' is configured to receive messages (e.g. video messages) from one or more source user terminals via the network interface 201' and network 101 (e.g. Internet), and to make those messages available for download to a corresponding messaging application on the destination user terminal 102 via the network interface 201' and network 101. Alternatively or additionally, some or all of the messages could be generated at the server 103 for download to the destination user terminal 102. Either way, the automatic message manager 205' at the server 103 is arranged to manage the messages stored on the server's storage 202' in an analogous manner to that described in relation to the client-side terminal 102 and messaging application 203 (in embodiments still on a per conversation, but in embodiments now taking into account messages in both directions between "source" and "destination" users). Any of the features discussed above may apply equally to the server side implementation. Where user interface features are described, these may still be implemented via the user interface of the user terminal 102, but based on information from messaging application 203' on the server 103.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
receiving user-consumable messages directed to at least one destination user;
marking a first set of the user-consumable messages as consumed messages based on detecting user interaction to engage in one or more of viewing or listening to the first set of the user-consumable messages;
marking a second set of the user-consumable messages as unconsumed messages based on not detecting user interaction to engage in one or more of viewing or listening to the second set of the user-consumable messages;
storing the consumed messages and the unconsumed messages in a storage device; and
executing, by a processing system, logic to separately process the consumed messages and the unconsumed messages by applying a first retention policy to the consumed messages and a second retention policy to the unconsumed messages such that the first retention policy and the second retention policy are separately applied to the user-consumable messages and the first retention policy and the second retention policy are implemented independent of one another.

2. The computer-implemented method of claim 1, wherein the user-consumable messages are media messages.

3. The computer-implemented method of claim 1, wherein the user-consumable messages are one or more of audio messages or video messages.

4. The computer-implemented method of claim 1, wherein the user-consumable messages comprise visible media messages, the consumed messages comprising viewed messages and the unconsumed messages comprising unviewed messages.

5. The computer-implemented method of claim 1, wherein the unconsumed messages comprise one or more of unread messages, unviewed messages, or un-listened-to-messages.

6. The computer-implemented method of claim 1, wherein the consumed messages comprise one or more of read messages, viewed messages, or listened-to-messages.

7. The computer-implemented method of claim 1, wherein the user-consumable messages correspond to messages of a particular conversation, and wherein the method further comprises applying one or more of the first retention policy or the second retention policy on a per conversation basis.

8. The computer-implemented method of claim 1, wherein said applying the second retention policy is such that a number of consumed messages affects neither retention nor deletion of the unconsumed messages, and said applying first retention policy is such that a number of unconsumed messages affects neither retention nor deletion of the consumed messages.

9. The computer-implemented method of claim 1, wherein said applying the first retention policy comprises determining when the number of consumed messages exceeds a threshold for consumed messages, and in response deleting at least one of the consumed messages from the storage device to bring the number of consumed messages back within the threshold for consumed messages.

10. The computer-implemented method of claim 9, wherein the user-consumable messages have an order from oldest to newest, and wherein said applying the first retention policy deletes the at least one of the consumed messages by deleting the oldest one or more consumed messages.

11. The computer-implemented method of claim 9, wherein said applying the second retention policy comprises determining when the number of unconsumed messages exceeds a threshold for unconsumed messages, and in response deleting at least one of the unconsumed messages from the storage device so as to bring the number of unconsumed messages back within a threshold for unconsumed messages, the threshold for unconsumed messages different than the threshold for consumed messages.

12. The computer-implemented method of claim 11, wherein the threshold for unconsumed messages is greater than the threshold for consumed messages.

13. The computer-implemented method of claim 1, wherein the second retention policy comprises never automatically deleting the unconsumed messages regardless of the number of unconsumed messages.

14. The computer-implemented method of claim 13, wherein the second retention policy causes the number of unconsumed messages to be limited by a storage capacity of the storage device.

15. The computer-implemented method of claim 1, wherein the user-consumable messages are received over a network.

16. The computer-implemented method of claim 15, wherein the network is a packet-based network.

17. The computer-implemented method of claim 15, wherein the network is the Internet.

18. A computing device comprising:
a storage device for storing user-consumable messages directed to at least one destination user; and
an automatic message manager configured to:
mark a first set of the user-consumable messages as consumed messages based on detecting user interaction to engage in one or more of viewing or listening to the first set of the user-consumable messages;
mark a second set of the user-consumable messages as unconsumed messages based on not detecting user interaction to engage in one or more of viewing or listening to the second set of the user-consumable messages; and
separately process the consumed messages and the unconsumed messages by applying a first retention policy to the consumed messages and a second retention policy to the unconsumed messages such that the first retention policy and the second retention policy are separately applied to the user-consumable messages and the first retention policy and the second retention policy are implemented independent of one another.

19. The computing device of claim 18, wherein the user-consumable messages comprise visible media messages, the consumed messages comprising viewed messages and the unconsumed messages comprising unviewed messages.

20. A system comprising:
one or more processors; and
one or more computer-readable storage media storing instructions that are executable by the one or more processors to perform operations including:
receiving user-consumable messages directed to at least one destination user;
marking a first set of the user-consumable messages as consumed messages based on detecting user interaction to engage in one or more of viewing or listening to the first set of the user-consumable messages;

marking a second set of the user-consumable messages as unconsumed messages based on not detecting user interaction to engage in one or more of viewing or listening to the second set of the user-consumable messages; and
separately processing the consumed messages and the unconsumed messages by applying a first retention policy to the consumed messages and a second retention policy to the unconsumed messages such that the first retention policy and the second retention policy are separately applied to the user-consumable messages and the first retention policy and the second retention policy are implemented independent of one another.

* * * * *